July 5, 1966  J. T. THORP  3,259,344

AIRCRAFT SEAT EJECTION

Filed Feb. 24, 1964  4 Sheets-Sheet 1

INVENTOR.
JAMES T. THORP

BY
ATTORNEY.

July 5, 1966  J. T. THORP  3,259,344
AIRCRAFT SEAT EJECTION

Filed Feb. 24, 1964  4 Sheets-Sheet 4

3,259,344
AIRCRAFT SEAT EJECTION

James T. Thorp, Webster Groves, Mo., assignor to Lambert Engineering Company, St. Louis, Mo., a corporation of Missouri
Filed Feb. 24, 1964, Ser. No. 346,650
12 Claims. (Cl. 244—122)

This invention relates to the ejection from aircraft of occupied seat masses.

Various systems and contraptions have heretofore been designed and proposed for the ejection, with or without a seat, of airmen from aircraft in flight. In view of the physiological factors involved, it is generally recognized to be preferable to eject an airman together with the seat (which he occupies in the aircraft), and to cause the two to travel together in space for a distance at least sufficient to clear the aircraft empennage. Customarily, the seat, together with its human cargo, is ejected from the aircraft by means of a catapult which in most cases, is energized by fluid pressure generated by the combustion (low explosion) of a propellent composition which supplies both the fuel for combustion and the oxygen to sustain combustion.

In my Patent No. 3,079,111, it was proposed either to augment the ejecting action of a catapult, or to supersede it entirely by a rocket system arranged beneath the seat to be ejected, and so arranged that the jet thrust thereof was in a direction which was very close to alignment with the path of the center of gravity of the seat occupant-mass in its travel upon ejection from the craft. In such an arrangement, where the rocket power is ancillary to the initial ejecting action of a mechanism, such as a catapult, it is desirable to so inter-relate the catapult and the rocket engine that the latter is not initiated until after the action of the catapult is well underway, and the most fool-proof way of accomplishing this appears to be the utilization of the fluid pressure generated in energizing the catapult to initiate ignition of the rocket engines.

In catapults of the character referred to, it is customary to have an expansion chamber defined by two telescopically related members, and to utilize the gas generated by the propellant in such manner as to tend to separate the telescopically related members and thereby supply the catapulting energy. One of the telescopically related members is conventionally affixed to, and travels in flight with, the ejected seat, while the other of the telescopic members is permanently affixed to, and travels with, the aircraft structure. Where the interior one of the telescopically related members is permanently affixed to, and remains with, the airplane, it is a simple matter to arrange for the conduction of fluid pressure from the expansion chamber to a suitable pressure-sensitive device for initiating the ignition of a rocket engine; and to accurately control the position, in the relative movement of the telescopically related members, at which such conductor shall become effective to transmit fluid pressures as aforesaid. In such an arrangement (where the interior tubular member remains with the aircraft, and the exterior member travels with the seat in ejection) the relative movement between the interior and exterior member may readily be made to function as a valve by providing a port in the wall of the exterior member at a position where it is normally covered (on the inside) by the wall of the interior member, and connecting the fluid pressure conductor to that port. In such an arrangement, there is no relative movement between the seat and its attached port or valve, but when the end of the interior telescopic member passes over, and clears, the port in the exterior telescopic member, the fluid pressure which has built up within the expansion chamber is immediately released through the uncovered port, into the pressure conductor, and thus may be made to accomplish desirable sequencing between operation of the catapult, and ignition of the rocket engine with a predetermined hiatus between them.

On the other hand, there are many mechanical considerations which render it preferable that the interior one of the telescopically related members be the one which travels with the seat during ejection, and the exterior one be that which remains affixed to, and travels with, the aircraft. Application of the expedients described in the next preceding paragraph, in order to accomplish the sequencing desired, are, however, prohibited by the fact that, from the instant the relative movement between telescopic parts of the catapult begins, there arise conditions which tend to sever any device which would conduct fluid pressure from the catapult expansion chamber to the rocket engine, or anything else moving with the seat. In spite of such difficulties, the arrangement wherein the exterior one of the telescopically related members remains with the aircraft (after ejection of the seat) has been deemed so advantageous per se, that cumbersome and ludicrous (if they were not so hazardous) expedients have been proposed for delaying ignition of the rocket engine until operation of the catapult is well under way. For example, it has been suggested that a long lanyard, with one end tied to the aircraft and the other end tied to the ejectable body, will become taut during ejection and can be made to trigger the rocket engine at the instant between the time it becomes taut and its almost simultaneous rupture. The objections to such a contrivance are numerous and manifest, as well as latent.

Accordingly, it is one object of the present invention to provide a rocket engine mounted on an aircraft seat and so inter-related with a catapult, whose interior telescopic member is permanently affixed to the seat, that, at a predetermined position in the relative movement between such telescopic members, the fluid pressure within the expansion chamber shall be communicated to an activator for the rocket engine.

Another object of the invention is to improve the firing pin organization of such a catapult so that it clearly indicates, even to the unskilled eye, whether or not it is loaded.

The invention contemplates the accomplishment of the first objective by the provision of auxiliary telescoping members (one fixed to the airframe, the other fixed to the seat) whose relative movement during operation of the catapult opens a valve and conducts the fluid pressure generated in the catapult to the pressure-sensitive device on the seat which it is desired to operate in predetermined sequence.

In accordance with the preferred embodiment of the present invention, the interior one of two telescopically related members (which define an expansion chamber of the catapult) is provided at its upper end with a cartridge chamber so located as to lie almost wholly within the exterior one of the telescopic members (when the catapult is loaded but idle), and to move with the seat in ejection. Such cartridge chamber is provided with an apertured wall through which the gases generated by the cartridge may pass freely to an expansion chamber beyond that wall; and provision is made so that, at a predetermined position in the separating movement of the telescopically related members, gas pressure from the combustion chamber is bled off around the cartridge chamber, and from thence conducted to pressure-sensitive devices such as the ignition system for a rocket engine. To effectuate the predetermined sequencing between the operation of the catapult and the ignition of the rocket engine, the invention contemplates that the aforesaid apertured wall of the cartridge chamber be provided with a tube extending axially of the telescopic members, and that (when the catapult is idle) a rod, freely movable within the tube but having a relatively gas-tight fit therewith, be anchored at the remote end of the exterior one of the telescopic members (which is permanently affixed to the airframe). Thus, the fluid pressure in the expansion chamber is excluded from the axial tube so long as the rod occupies it, but is admitted thereinto when the rod has vacated it. The axially extending tube interconnects with a duct in said apertured cartridge chamber wall (which duct is not directly connected with the apertures in that wall) and from thence is conducted to a pressure-sensitive device which, during ejection, moves bodily with the cartridge chamber, the inner tube of the catapult, the seat and all other ejectable appurtenances.

One or more pressure-sensitive devices may thus be actuated by fluid pressure bled off from the catapult. In addition to igniting the rocket engine, other functions incidental to the seat ejection, and protecting the airman, may be accomplished by the bled-off fluid pressure.

One embodiment of the invention is illustrated in the accompanying drawings, in which.

Figure 1:
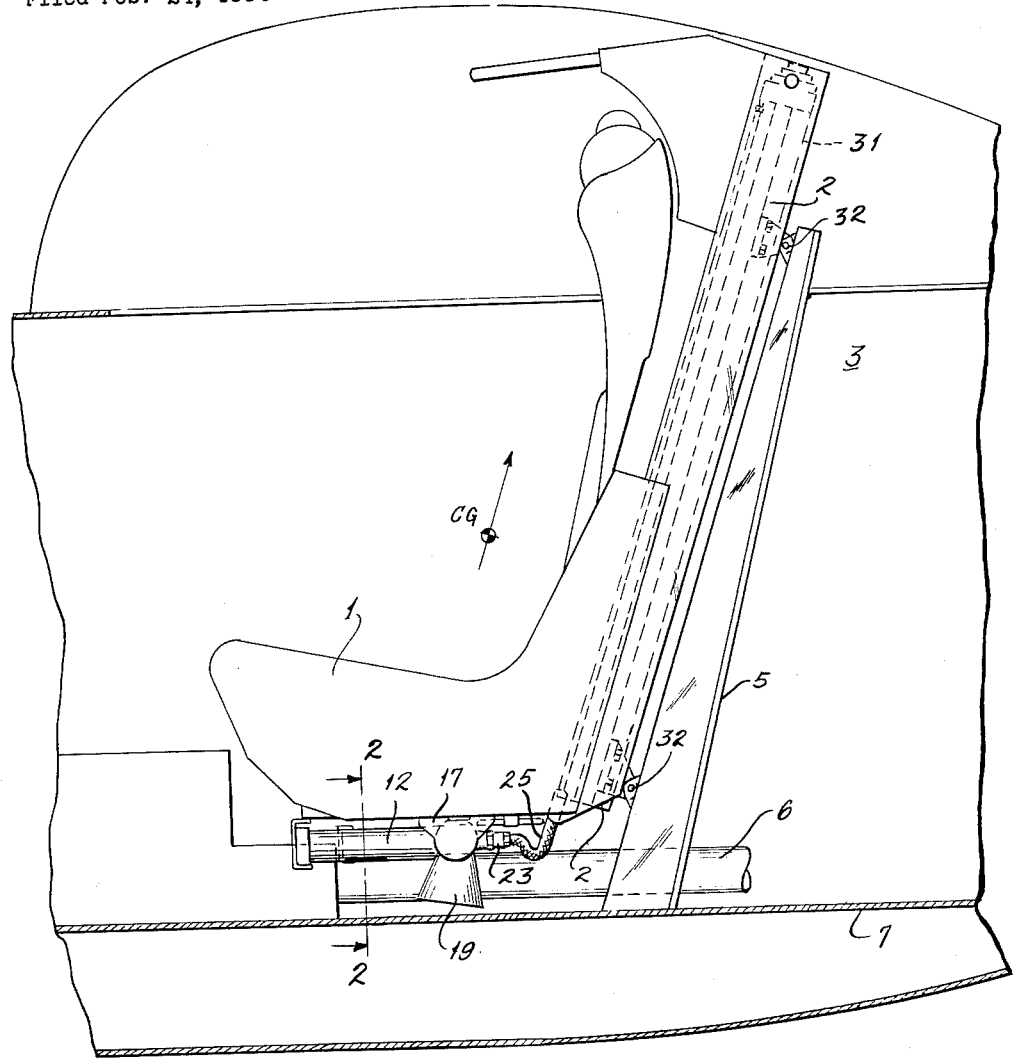
FIGURE 1 is a view in side elevation (partly in section) of a typical ejectable seat equipped with a catapult and rocket engine constructed and inter-related in accordance with the present invention.
Figure 4:
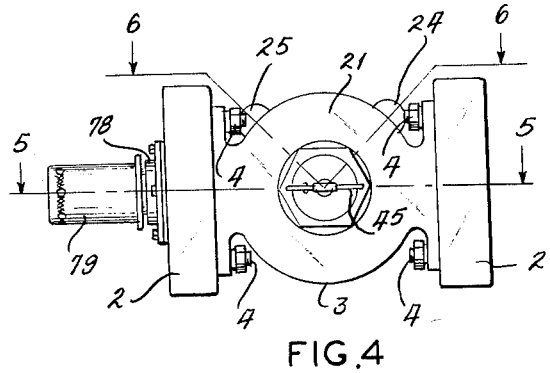
FIGURE 4 is a top plan view of the catapult.

In FIGURE 1 of the drawings, a form of ejectable seat is shown in which the ejection is accomplished initially by the action of a catapult, and secondarily by the action of a rocket engine. This represents a set of conditions under which it is preferable to delay the ignition of the rocket engine until the action of the catapult is well under way. In the embodiment shown, a conventional pan type seat frame 1, having a buttocks-engaging portion which is vertically adjustable relative to its back, is provided. The seat back is rigidly secured to a pair of spaced rails 2 which provide the customary mounting for the ejectable parts of catapult 3. At its upper end, catapult 3 has a yoke 21 which is connected in thrust-transmitting relation with the rails 2, as by studs and nuts 4 (FIGURE 4); and the non-ejectable parts of the catapult 3 are connected to structural parts of the airframe such as bulkhead 5, a longitudinal spar, or both, all in the customary manner. Thus, both the seat 1 and rails 2 are suspended from a non-ejectable part of the catapult, but are otherwise free of force-transmitting connection with permanent structure of the aircraft.

When so mounted, the bottom of seat 1 is disposed at least a few inches above the cabin floor 7, which is usually (at least at positions sidewardly of torque tube 6) slightly lower than the upper side of the torque tube. Thus between floor 7 and the under-surface of seat 1, there is space sufficient to accommodate small caliber rocket grain containers when lying on their side, i.e., with their longitudinal axes more or less parallel with torque tube 6. Accordingly, there is provided beneath the seat 1, and above floor 7, a rocket engine consisting of one or more rocket grain containers on each side of torque tube 6. In the embodiment shown, there are four such containers 8, 9, 10, and 11, on the port side of torque tube 6, and four more such containers 12, 13, 14, and 15, on the starboard side thereof. The several containers are each threaded, or otherwise releasably connected, to a manifold 16, which is securely connected in thrust-transmitting relationship with the bottom of seat 1, as by means of brackets 17 at each end of manifold 16. In the embodiment shown, manifold 16 is provided with a nozzle 18 at one side, and a nozzle 19 at the other side. The nozzles 18 and 19, respectively, control the direction of jet thrust from the battery of four rocket propellent containers on the corresponding side of manifold 16. While, as shown in the drawings, but one nozzle is provided at each side of the manifold, it will be understood that, if desired, a plurality of nozzles can be provided on each side, and such is in fact desirable when the limitations of space will not accommodate a single nozzle of adequate magnitude.

While, in the embodiment shown, the nozzles 18 and 19 are of the non-retractable type, it will be understood that, where the limitations of space demand, such nozzles may be of the retractable type shown and described in my Patent No. 3,079,111, but, in any event, the respective nozzles are preferably equipped with a releasable closure plate which substantially seals the mouth of the nozzle against the egress of fluid until the rocket grains on both sides of manifold 16 are ignited. Once the rockets are ignited, however, the pressure within manifold 16 substantially increases and expels the closure plates.

On the aft side of manifold 16, a pair of fluid pressure-sensitive rocket ignitors 22 and 23 are provided. The ignitors 22 and 23 may be of any fluid pressure-sensitive type known in the art to be suitable for the purpose, and are connected, respectively, through conduits 24 and 25 to a source of gas pressure in the catapult now to be described. When, as above described, the bottom part of seat 1 (on which the rocket engine is mounted) is adjustable relative to rails 2, flexibility must be provided in conduits 24 and 25 to accommodate the adjustability; and such may be accomplished by making the conduits, at least in part, of flexible hose which may, if necessary, be armored.

Figure 7:
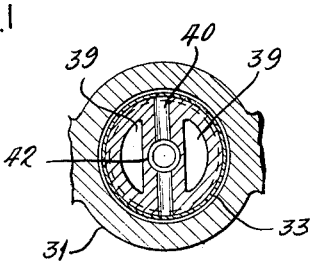
FIGURE 7 is a sectional view taken along line 7—7 of FIGURE 5.
Figure 2:
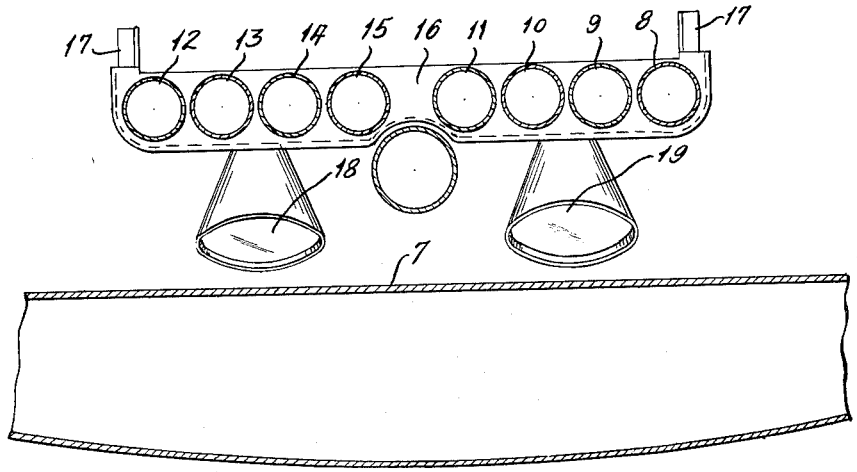
FIGURE 2 is a sectional view taken along line 2—2 of FIGURE 1.
Figure 3:
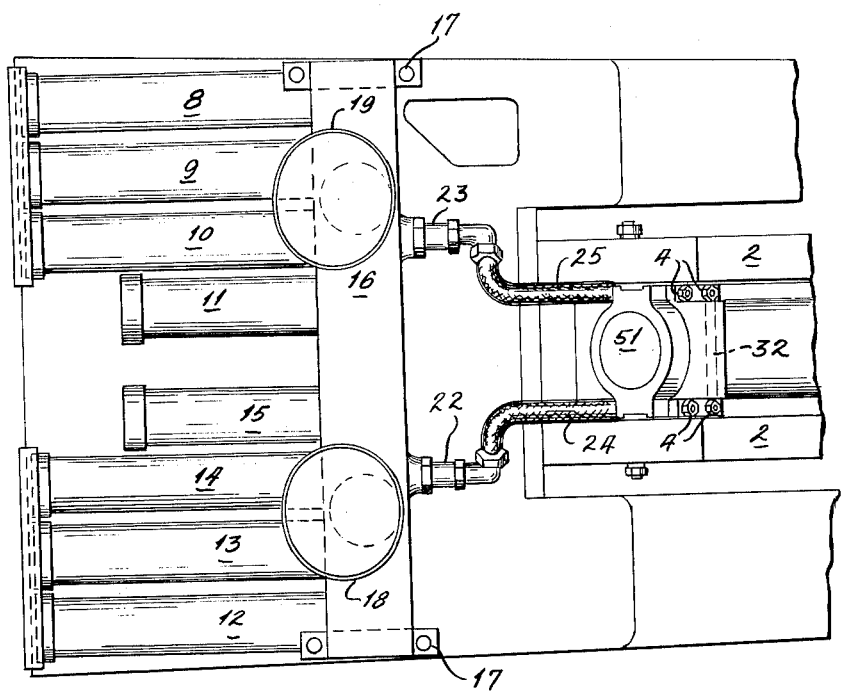
FIGURE 3 is a bottom view of the seat and appurtenances which travel with it, and showing the inter-relationship of the catapult.
Figure 8:
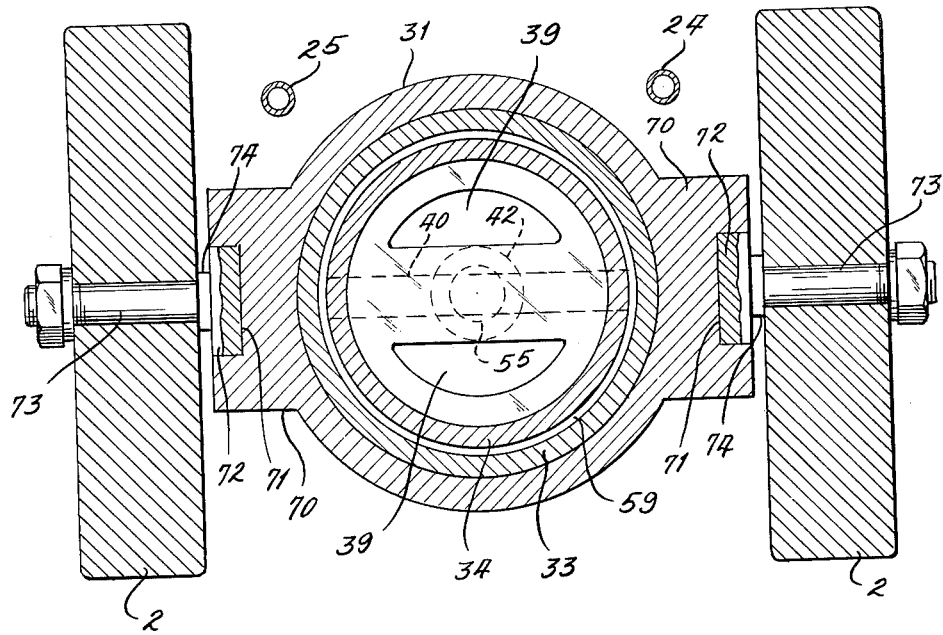
FIGURE 8 is a sectional view taken along line 8—8 of FIGURE 5.

The catapult consists essentially of two telescopically related separable tubes within which gas pressure may be generated to eject one from the other. In the embodiment shown, the exterior tube 31 is secured to bulkhead 5, by means of connectors 32, so that tube 31 remains permanently with the aircraft even after the ejection of the seat. Within tube 31, there is telescopically received another tube 33, the upper end of which is connected to the seat by yoke 21, bolts 4 and rails 2, as aforesaid. At its upper end, tube 33 has a chamber 34 to accommodate a cartridge 43. In the form shown, tube 33 is threadedly connected at 35 to a coupling 36, which latter is in turn threadedly connected at 37 to the upper end of cartridge chamber 34, and therebeyond at 26 to a firing pin assembly (later to be described), as well as to yoke 21. At its lower end, cartridge chamber 34 has a wall 38 through which there extends a pair of openings 39, as shown in FIGURES 7 and 8 (and dotted in FIGURE 5), so that the interior of cartridge chamber 34 is in constant open communication with the interior of tube 33 therebelow. Within wall 38, there is also provided a duct 40 which, in the form shown, extends diametrically to the outer periphery of the cartridge chamber. Centrally of wall 38, the lower side thereof is provided with a boss 41 having an interiorly threaded bore communicating with duct 40. At boss 41, a small caliber tube 42 is connected in a position such as to extend axially of tubes 31 and 33, and preferably in alignment with the longitudinal axes of said tubes. The construction is such that, when the catapult is idle, duct 40 is sealed from the interior of cartridge chamber 34, but under certain circumstances later to be described, will be subjected to fluid pressure generated in cartridge chamber 34 and communicated to duct 40 from the interior of tube 33 and through tube 42.

A suitable fluid pressure generative device, such as a cartridge 43, is accommodated in cartridge chamber 34, and loaded with an appropriate charge of any suitable gas generating material, such as propellant powder of the character generally employed in such devices. Cartridge 43 is provided with a suitable percussion cap disposed to be fired by a firing pin 44 shown in the cocked position in FIGURE 5, and which is triggered by the withdrawal of a sear 45 in a manner well known in the art, or by other suitable means.

At the lower end of tube 33, it is provided with a series of gaskets or sealing rings 46 which make engagement with the inner periphery of tube 31. On its inner periphery at the lower end thereof, tube 33 is provided with a circumferential groove 47 arranged and adapted to accommodate outwardly projecting lugs 48 on a series of axially extending fingers, which together constitute a collet 49. The collet fingers project from a sleeve 50 which, through connector 51, is fixed to the lower end of tube 31. Connector 51 provides a confining seat for the lower end of a spring 52, whose upper end is received within a cup 53, so that spring 52 constantly biases cup 53 away from connector 51. The upper outer periphery of cup 53 is tapered, as shown at 54, and there is a corresponding taper on the inside of the fingers constituting collet 49, which fingers are under constant radially inward bias, but are forced outwardly by the taper 54 when cup 53 is in the position shown in FIGURE 5.

Figures 5, 6:
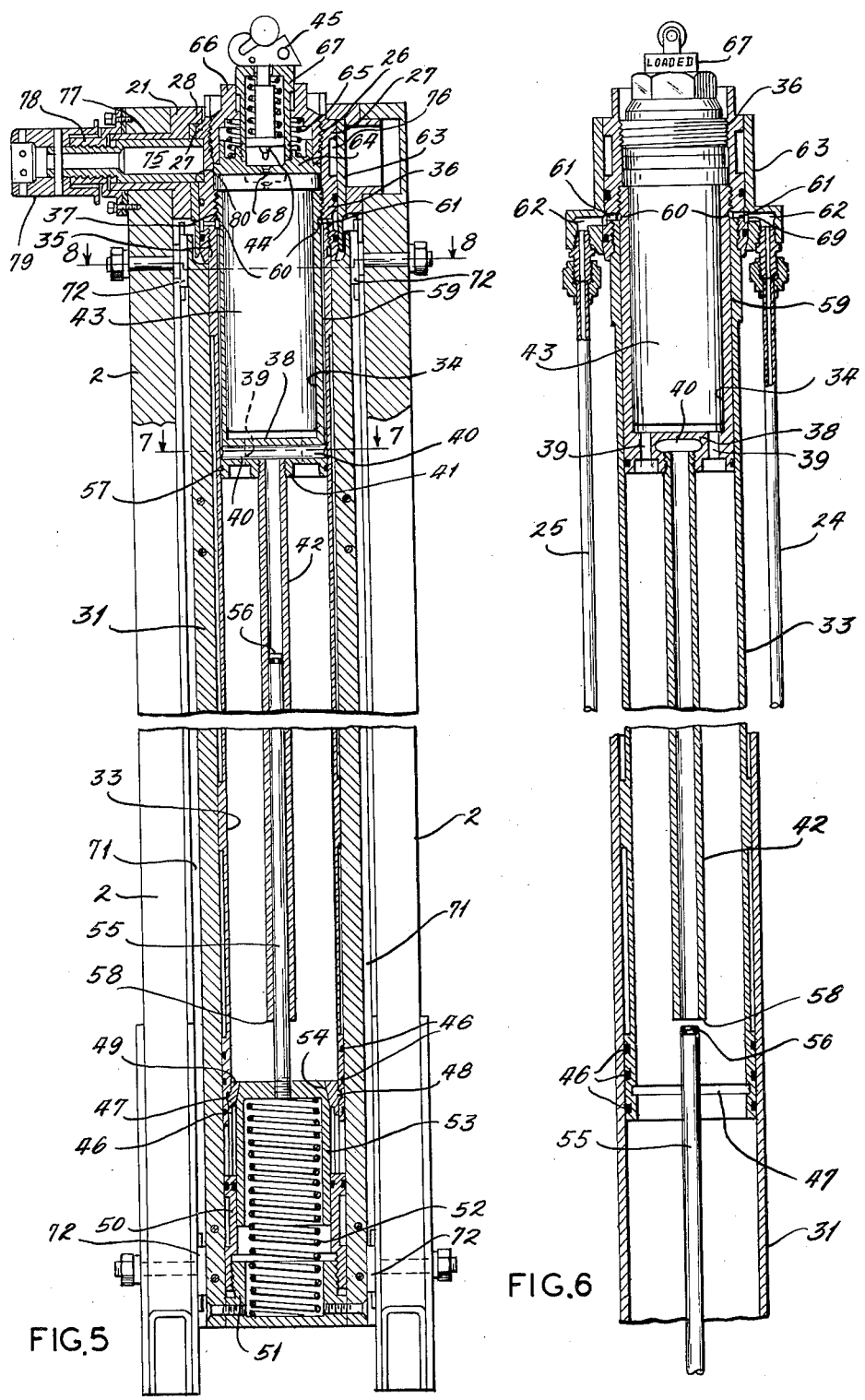
FIGURE 5 is a longitudinal sectional view taken along line 5—5 of FIGURE 4, showing the catapult in its cocked and ready position.
FIGURE 6 is a longitudinal sectional view taken along line 6—6 of FIGURE 4, and showing the catapult parts in the partially ejected position.

In the condition shown in FIGURE 5, the collet 49, being in engagement at groove 47 with tube 33, mechanically retains tube 33 in the position shown. However, upon the development of fluid pressure on the interior of tube 33, as, for example, resulting from the firing of cartridge 43, the pressure developed acts upon the upper face of cup 53, and exerts a force tending to compress spring 52. When the pressure within tube 33 overcomes the force exerted by spring 52, cup 53 is moved downwardly (as seen in FIGURE 5) a distance sufficient to permit collet 49 to contract and release itself from engagement with groove 47. When this occurs, inner tube 33 is free to move outwardly relative to outer tube 31 as a result of the pressure developed in the expansion chamber defined initially by the interior of tube 33 and the head of cup 53. Operation of the catapult is thereby initiated, and the upward motion of tube 33 is transmitted through coupling 36 to yoke 21 by means of the overlapping relationship between annular rib 27 on the former and annular rib 28 on the latter; and from yoke 21 to rails 2 and seat 1 as aforesaid.

Projecting from the head of cup 53 is a rod 55, which, in the normal inoperative condition of the catapult as shown in FIGURE 5, is aligned with, and extends into, the interior of tube 42. While rod 55 provides for a gastight fit within tube 42, it is freely movable axially therein. In order to serve as an effective valving means for controlling the flow of fluid through tube 42 while, at the same time, imposing the minimum drag on relative movement between the telescoping parts, the free end of rod 55 is preferably provided with a sealing member 56 of "Teflon" (poly tetrafluoro ethylene) or comparable material. With the arrangement just described, it will be understood that the fluid pressure building up and existing within tube 33 is prevented from passing through tube 42 as long as rod 55 occupies the same, but once rod 55 has vacated tube 42, there is an immediate communication of fluid pressure from tube 33 through tube 42 to duct 40, and to the space 59 between cartridge chamber 34 and the interior periphery of tube 33 above a location at which O-ring 57, or other appropriate sealing means, is provided to prevent the flow of gas upwardly along the inside wall of tube 33 toward duct 40. The particular degree of separation between tubes 31 and 33 which must be achieved before pressure fluid is conveyed through tube 42 is therefore determined by the length of one or both of tube 42 and rod 55. Normally, such would not occur until tubes 31 and 33 are at least halfway toward separation, but, in any event, when seal 56 on rod 55 emerges from end 58 of tube 42, fluid pressure generated in cartridge chamber 34 is communicated through apertures 39 to tube 33, tube 42, and duct 40, to the interspace 59 between the outside periphery of cartridge chamber 34 and the adjacent inside periphery of tube 33. In order to permit the passage of fluid freely through such interspace 59, a loose fit is there provided to conduct such fluid beyond the threaded end 35 of tube 33 to an annular space 60, from whence it is conveyed through holes 61 in coupling 36 to a circumferential bustle space 69, and thence into chamber 62 in collar 63 which connect with conduits 24 and 25, respectively. The aforesaid "loose fit" which provides the interspace 59 is shown in exaggerated proportions in FIGURE 8.

From conduits 24 and 25, the fluid pressure is applied to the respective rocket ignitors 22 and 23. In this way, the firing of the rocket engines is made dependent upon a predetermined previous separation movement in the catapult components, and the precise instant at which such actuating pressure is applied to the rocket ignitors may be controlled as desired, within practical limits, so as to be effective either immediately after relative motion between catapult tubes 31 and 33 commences, or delayed until said tubes have almost reached the point of separation, or any intermediate station. As related above, the length of the delay, after such separating motion begins, is determined by the length of rod 55 or tube 42, or both.

The catapult of the illustrated embodiment is of the type known in the art as "fully guided"; and the mechanical organization which guides the seat, and its adjunct parts, during the initial stages of its ejection is best shown in FIGURES 5 and 8. The outside catapult tube 31 has opposite outwardly projecting longitudinal ribs 70, each of which is grooved to provide a longitudinally extending raceway 71 which is permanently fixed relative to the aircraft, but not the seat. The respective raceways 71 slidably receive a plurality of guide shoes 72, each of which is secured, as by bolts 73, to one of rails 2 so as to move therewith. To eliminate drag between ribs 70 and rails 2 during ejection, the shoes 72 are preferably spaced from the nearest surface of rails 2, as by the provision of spacers 74. While FIGURE 5 shows two sets of opposite shoes 72, one set near the top, the other near the bottom, those skilled in the art will understand that it is desirable to provide a set of such shoes in the central zone which is broken away in FIGURE 5 because a very few inches of ejection movement release the upper set of shoes from the raceways.

In order to quickly detach the seat and its adjunct parts from the catapult (as for the purpose of inspection or replacement), there is provided latch-bolt 75 which is manually movable into and out of engagement with an annular recess 76 in the outer wall of coupling 36. The latch-bolt operates in a barrel 77 on yoke 21, which barrel projects through a hole in one of the rails 2, and on the outside of that rail, there is secured an internally threaded cap 78 positioned to cover the end of barrel 77. Latch-bolt 75 is in threaded engagement with the cap 78, and therebeyond is pinned to a knob 79. Thus, when the knob 79 is turned in one direction, latch-bolt 75 is retracted out of recess 76 where, as shown in FIGURE 5, it is latching the catapult to an assembly consisting of yoke 21, collar 63, side rails 2, and seat 1. It is preferable, however, that the amplitude of movement for latch-bolt 75 be less than sufficient to permit its escape from hole 80 in collar 63 until the last-mentioned assembly has been separated from the catapult.

While, in the embodiment described, the expansion chamber of the catapult is circumscribed by two telescopically related tubes 31 and 33, it is to be understood that an additional telescopically related tube can, if desired, be interposed between the outside and the inside ones, and thereby to provide for greater extent of ejection before the catapult is deactivated by separation of its telescopically related parts.

While, in the embodiment of the invention thus far described, it is contemplated that the initial motion in ejecting the seat 1 be accomplished by the catapult, and that the thrust of the rocket engine be applied to the seat only after the latter has been moved substantially by the catapult, the invention nevertheless contemplates that the rocket engine may be actuated so as to supply the initial, or indeed the entire ejection impulses. In such cases, the ignition of the rocket engine may be initiated by means other than the generation of fluid pressure in the catapult, as, for example, a small cartridge or cannister of low explosive or compressed gas, or a source of electrical energy, any of which may be actuated by the same airman's motion which triggers the catapult in the embodiment described.

A particularly important feature of the present invention resides in the address of nozzles 18 and 19 so that the direction of the jet thrust emanating therefrom lies within 10° of a plane which embraces the path of the center of gravity of the seat-occupant mass during the initial stages of ejection. The postulated center of gravity of the seat-occupant mass is shown by the letters CG in FIGURE 1, and the path of its movement is indicated by the arrow thereadjacent. Thus, when the longitudinal axes of the rocket containers 8–15 are horizontal, the nozzles 18 and 19 will be canted so that the lower ends of their central axes lead the upper ends thereof by an amount sufficient to bring such axes into substantial parallelism with, or into, a plane which substantially embraces the line indicated by the arrow in FIGURE 1. If desired, the nozzles can be canted in the direction normal to the plane of FIGURE 1 so that their thrust lines converge at or near the center of gravity, but, in any event, the thrust lines are preferably equi-spaced sidewise from a fore-aft vertical plane through the center of gravity.

A further safety feature of the invention concerns the provision of readily discernible signal means on the catapult, which indicates, even to the uninitiate, whether or not a cartridge is disposed in the cartridge chamber 34. This is accomplished by the provision about firing pin 44 of a spring-biased follower 64, which, when there is no cartridge such as 43 in the cartridge chamber 34, occupies the position shown in dotted lines in FIGURE 5. Follower 64 is under constant downward bias by spring 65, which reacts against a head 66 in threaded engagement with coupling 36. However, spring 65 has no effect upon the operation of firing pin 44, which latter is spring-biased in the conventional manner, and fitted within a cup 67 which is in threaded engagement with follower 64. Follower 64 has a central opening 68 to accommodate passage of firing pin 44 into engagement with the cap in the head of cartridge 43.

With this arrangement, the portion of cup 67, which projects above head 66, when the parts in the full-line position shown in FIGURES 5 and 6, can be made to serve as a signal to designate, either by color code or by legend (such as "LOADED"), that a cartridge is in position in chamber 34. However, when no cartridge is in posiiton within said chamber, follower 64 is biased down into the zone which would be occupied by the head of a cartridge, if such were present. Such downward movement of follower 64, under the bias of spring 65, draws cup 67 downwardly within head 66 until the signaling portion of cup 67 is obscured within head 66.

From the foregoing description, those skilled in the art should readily understand the construction and operation of the apparatus which has been described, and realize the advantages which accrue from the utilization of the same in the ejection of seat-occupant masses from aircraft. While one complete embodiment of the invention has been described in detail, and various alternatives have been suggested, such is not intended to connote that the invention is limited to the details of the embodiment described, but, on the contrary, it is to be distinctly understood that such variations and modifications as present themselves to those skilled in the art, without departing from the spirit of the invention, are contemplated by and within the scope of the appended claims.

Having thus described the invention, what is claimed and desired to be secured by Letters Patent is:

1. In aircraft having an ejectable seat, a catapult connected to the seat for ejecting the same, rocket means located outside said catapult and beneath the seat, an ignitor for said rocket means, said ignitor being located beneath the seat and outside said catapult, and gas generating means mounted on and movable with the seat for energizing said catapult and activating said ignitor.

2. The combination of claim 1 wherein the catapult has separable telescopically assembled tubes which together form an expansible chamber for receiving and confining the gases generated by said gas-generating means, the inner one of said tubes being connected to said seat, and the outer one of said tubes being connected to a non-ejectable part of said aircraft, a normally closed valve arranged to open automatically when said tubes are moving toward separation, said valve being arranged to control the flow of fluid from said expansible chamber toward said ignitor.

3. In an aircraft seat-ejecting mechanism including a catapult having a cartridge chamber and an expansion chamber, a wall separating said chambers, said wall having an opening extending therethrough to intercommunicate the interiors of said chambers, and said wall having a second opening extending therethrough which communicates with the exterior but not the interior of said cartridge chamber, and normally closed valve means openable in response to operation of said catapult to permit gas flow from said expansion chamber through said second opening.

4. The improvement of claim 3 wherein a firing pin assembly is provided at the upper end of said cartridge chamber, means for constantly biasing said assembly toward the lower end of said cartridge chamber, means in said cartridge chamber for limiting the downward movement of a cartridge head therein and for limiting the movement of said assembly under said bias when no cartridge is present in said cartridge chamber, said assembly having a signaling part exposed for view when a cartridge is in said chamber but concealed from view when no cartridge is in said chamber.

5. The improvement defined in claim 3 wherein the valve means is normally closed but opens automatically when the catapult moves through a predetermined stroke.

6. The improvement of claim 5 having means for conducting fluid pressure from said second opening to a remote point on the seat at which a pressure-sensitive member is located.

7. In an aircraft having a seat, seat-ejecting mechanism including a catapult having gas generating means and an elongated expansion chamber composed of telescoping parts separable in operation, a duct extending longitudinally within the interior telescoping part from the exterior of the expansion chamber to a position within the same, said duct having a normally closed valved aperture within the expansion chamber, and means for opening said valved aperture while said parts are relatively moving toward separation but substantially before they separate.

8. The combination of claim 7 wherein a rocket engine is mounted on the bottom of said seat, said engine having nozzles addressed to direct their thrust lines in a plane which substantially embraces the line of travel of the center of gravity of the seat-contained mass, and pressure-sensitive means responsive to the opening of said valved aperture for igniting said rocket engine when the telescoping parts of said expansion chamber reach a predetermined separating relationship.

9. In aircraft seat-ejecting mechanism including a catapult having an expansion chamber defined by a tube which travels with the seat during ejection and another tube that remains with the aircraft after seat ejection, the improvement which comprises, said first-named tube having therewithin a cartridge chamber permanently vented into the expansion chamber, a peripheral seal between the exterior wall of said cartridge chamber and the interior wall of said first-named tube, and means controlled by relative movement between said tubes for by-passing said seal and passing gas from said expansion chamber between the exterior wall of said cartridge chamber and the interior wall of said first-named tube.

10. In an aircraft seat-ejecting mechanism having a catapult at the back of the seat, and a rocket engine located outside said catapult and beneath the seat, said catapult having relatively movable telescopically related separable parts the interior one of which is connected to and movable with the seat, means for transmitting fluid pressure from the interior of said inner one of said parts to said rocket engine, a normally closed valve controlling the flow of fluid through said means, and means responsive to relative separating movement of said telescoping parts to open said valve.

11. In aircraft having an ejectable seat, rocket means located beneath the seat, an ignitor for said rocket means, said ignitor being located beneath the seat, gas generating means mounted on the back of the seat, and means for transmitting gas pressure from said gas generating means to said ignitor for activating the latter.

12. In aircraft having an ejectable seat, rocket means located beneath the seat, an ignitor for said rocket means, said ignitor being located beneath the seat, gas-generating means mounted on and movable with the seat for activating said ignitor, a catapult mounted on the seat, said catapult having separable telescopically assembled tubes which together form an expansible chamber for receiving and confining the gas generated by said means, the inner one of said tubes being connected to said seat, the outer one of said tubes being connected to a non-ejectable part of the aircraft, a normally closed valve arranged to open automatically when said tubes are moving toward separation, said valve being arranged to control the flow of fluid from said expansible chamber toward said ignitor and said valve consisting of: a duct carried by said inner tube and a removable filler for said duct carried by said outer tube, said filler being withdrawn from said duct as the tubes move relatively toward separation, and said duct being connected to conduct fluid from said chamber toward said ignitor when the filler is withdrawn from the duct.

References Cited by the Examiner
UNITED STATES PATENTS

| | | | |
|---|---|---|---|
| 2,755,042 | 7/1956 | Paddon | 244—122 |
| 2,954,947 | 10/1960 | Zabelka et al. | 244—122 |
| 3,034,289 | 5/1962 | Stott et al. | 244—122 |
| 3,035,796 | 5/1962 | Glass | 244—122 |
| 3,079,111 | 2/1963 | Thorp | 307—911 |
| 3,115,320 | 12/1963 | Hirt | 244—122 |
| 3,124,324 | 3/1964 | Martin | 244—122 |
| 3,126,177 | 3/1964 | Markowitz | 244—122 |
| 3,130,947 | 4/1964 | Franks | 244—122 |
| 3,190,589 | 6/1965 | Mennborg | 244—12 |

MILTON BUCHLER, *Primary Examiner.*

FERGUS S. MIDDLETON, *Examiner.*

D. P. NOON, A. E. CORRIGAN, *Assistant Examiners.*